(12) United States Patent
Arakawa et al.

(10) Patent No.: US 8,973,985 B2
(45) Date of Patent: Mar. 10, 2015

(54) VEHICLE SEAT

(71) Applicant: NHK Spring Co., Ltd., Yokohama-shi (JP)

(72) Inventors: Shinji Arakawa, Yokohama (JP); Hiroshi Tsunashima, Yokohama (JP); Satoshi Matsuhashi, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 0 days.

(21) Appl. No.: 14/079,052

(22) Filed: Nov. 13, 2013

(65) Prior Publication Data

US 2014/0132040 A1    May 15, 2014

(30) Foreign Application Priority Data

Nov. 15, 2012    (JP) ................................. 2012-251254

(51) Int. Cl.
| | |
|---|---|
| *B60N 3/06* | (2006.01) |
| *A47C 17/04* | (2006.01) |
| *A47C 7/62* | (2006.01) |
| *B60N 3/00* | (2006.01) |
| *B60N 2/60* | (2006.01) |
| *B60N 2/44* | (2006.01) |
| *B60R 7/04* | (2006.01) |

(52) U.S. Cl.
CPC ........ *B60N 3/001* (2013.01); *B60N 3/06* (2013.01); *B60N 2/6009* (2013.01); *B60N 2/4495* (2013.01); *B60R 7/043* (2013.01)

USPC ...................................... 297/112; 297/188.04

(58) Field of Classification Search
USPC ................. 297/219.1, 112, 113, 114, 423.14, 297/188.04, 188.07
See application file for complete search history.

(56) References Cited

U.S. PATENT DOCUMENTS

| 226,729 | A | * | 4/1880 | Eastman ........................ 297/114 |
|---|---|---|---|---|
| 3,094,354 | A | * | 6/1963 | Bernier ......................... 297/112 |
| 3,761,124 | A | * | 9/1973 | Weik et al. ..................... 297/112 |
| 6,079,773 | A | * | 6/2000 | Hassan ....................... 297/188.13 |
| 6,079,779 | A | * | 6/2000 | Tanaka et al. .............. 297/228.13 |
| 7,255,405 | B2 | * | 8/2007 | Kodera et al. .............. 297/452.62 |
| 7,261,375 | B2 | * | 8/2007 | Godshaw et al. .......... 297/228.12 |

FOREIGN PATENT DOCUMENTS

| JP | 58047632 A | * | 3/1983 |
|---|---|---|---|
| JP | H6-81822 U | | 11/1994 |

* cited by examiner

*Primary Examiner* — Milton Nelson, Jr.
(74) *Attorney, Agent, or Firm* — Knobbe Martens Olson & Bear LLP

(57) ABSTRACT

There is provided a vehicle seat including: a seatback formed with a penetrating portion that penetrates from a front face side to a back face side; a placement member that is attached to the seatback so as to be capable of moving between a housed position housed inside the penetrating portion and closing off the penetrating portion and a lowered position lowered from the housed position towards the front side; and a flexible opening and closing member that is attached to the seatback and is capable of opening the penetrating portion and closing off the penetrating portion from the seatback back face side.

6 Claims, 8 Drawing Sheets

VEHICLE SEAT

CROSS-REFERENCE TO RELATED APPLICATION

This application is based on and claims priority under 35 USC 119 from Japanese Patent Application No. 2012-251254 filed on Nov. 15, 2012, the disclosure of which is incorporated by reference herein.

BACKGROUND

1. Technical Field

The present invention relates to a vehicle seat.

2. Related Art

Seats that are provided to a vehicle (vehicle seats) include hollowed seat structures wherein a seatback is formed with a hollowed portion, and that include a footrest unit housed on a seating face side of the hollowed portion and supported so as to be capable of turning towards a seat cushion side, and a child seat unit that is housed on a back face side of the hollowed portion and that is supported so as to be capable of turning towards a rear seat side, as described in for example Japanese Utility Model Application Laid-Open (JP-U) No. H6-81822.

In such vehicle seats, further improvements to usability (convenience) are desired when for example there is no seated occupant in the vehicle seat, and the vehicle seat is not being used as a footrest.

SUMMARY

In consideration of the above circumstances, an object of the present invention is to obtain a vehicle seat that can be used to rest the feet from the rear side and that also has excellent usability when not being used to rest the feet.

A first aspect of the present invention provides a vehicle seat including:

a seatback formed with a penetrating portion that penetrates from a front face side to a back face side;

a placement member that is attached to the seatback so as to be capable of moving between a housed position housed inside the penetrating portion and closing off the penetrating portion and a lowered position lowered from the housed position towards the front side; and a flexible opening and closing member that is attached to the seatback and is capable of opening the penetrating portion and closing off the penetrating portion from the seatback back face side.

In the present invention, the seatback is formed with the penetrating portion that penetrates from the front face side to the back face side. The placement member is capable of supporting the load of a seated occupant in the vehicle seat in the housed position housed inside the penetrating portion. Here, an attractive appearance from the back face side can be maintained by closing off the back face side of the seatback with the opening and closing member.

An article can be placed on a surface (upper face) of the placement member when the placement member is placed in the lowered position by lowering from the housed position towards the front side. The penetrating portion is not open towards the back face side when the back face side of the seatback is closed off by the opening and closing member, thereby suppressing the article placed on the placement member from falling off to the rear side.

The penetrating portion is opened up towards the back face side when the placement member is placed in the lowered position and the opening and closing member opens up the back face side of the seatback, thereby enabling an occupant seated in a rear seat to use the placement member to rest the feet (as a footrest or a leg rest). In the present invention the placement member can accordingly be employed to rest the feet from the rear side, and when not being employed to rest the feet, an article can be placed on the placement member, thereby giving excellent usability.

Moreover, since the opening and closing member is flexible, the opening and closing member can be appropriately deformed when opening up and closing off the penetrating portion, thereby enabling the movement range of the opening and closing member to be made smaller, giving excellent usability in this respect as well.

A second aspect of the present invention provides the vehicle seat of the first aspect, further including a covering member that is attached to the seatback, the placement member, or both, and that covers a surface of the placement member when the placement member is in the lowered position.

In a state in which an article has been placed on the surface (upper face) of the placement member in the lowered position, falling or positional displacement of the article placed on an article placement face can be suppressed by covering the surface (upper face) and the article with the covering member. This also makes it difficult to see the article from the outside.

A third aspect of the present invention provides the vehicle seat of the second aspect, wherein the opening and closing member also serves as the covering member.

The number of components can accordingly be reduced in comparison to a configuration in which the covering member and the opening and closing member are provided as separate members. The opening and closing member is flexible, thereby enabling articles to be covered so as to accommodate articles of various shapes.

A fourth aspect of the present invention provides the vehicle seat of the third aspect, further including a tie member that ties at least a portion of the opening and closing member to the placement member or to the seatback in a state in which the surface of the placement member is covered by the opening and closing member.

The opening and closing member can be maintained in a state covering the surface of the placement member by tying at least a portion of the opening and closing member to the placement member or to the seatback with the tie member.

A fifth aspect of the present invention provides the vehicle seat of any one of the first through fourth aspects, further including an anchor member that anchors one portion of the opening and closing member to another portion of the opening and closing member or to the seatback in a state in which the opening and closing member is opening up the penetrating portion and the one portion is folded back.

Other articles can be housed inside a folded back portion when the one portion of the opening and closing member is folded back and partially anchored by the anchor member in the opened up state of the penetrating portion by the opening and closing member, giving even more excellent usability.

A sixth aspect of the present invention provides the vehicle seat of any one of the first through fifth aspects, further including an upright wall projecting up from the periphery of the surface of the placement member.

An article on the article placement face can be suppressed from falling off by the upright wall that projects up from the periphery of the surface of the placement member even if the article moves.

Due to the above configuration, the present invention can be employed from behind as a footrest, and also has excellent usability in a state in which the footrest is not being used.

BRIEF DESCRIPTION OF THE DRAWINGS

Exemplary embodiments of the present invention will be described in detail based on the following figures, wherein.

DETAILED DESCRIPTION

Figure 1:
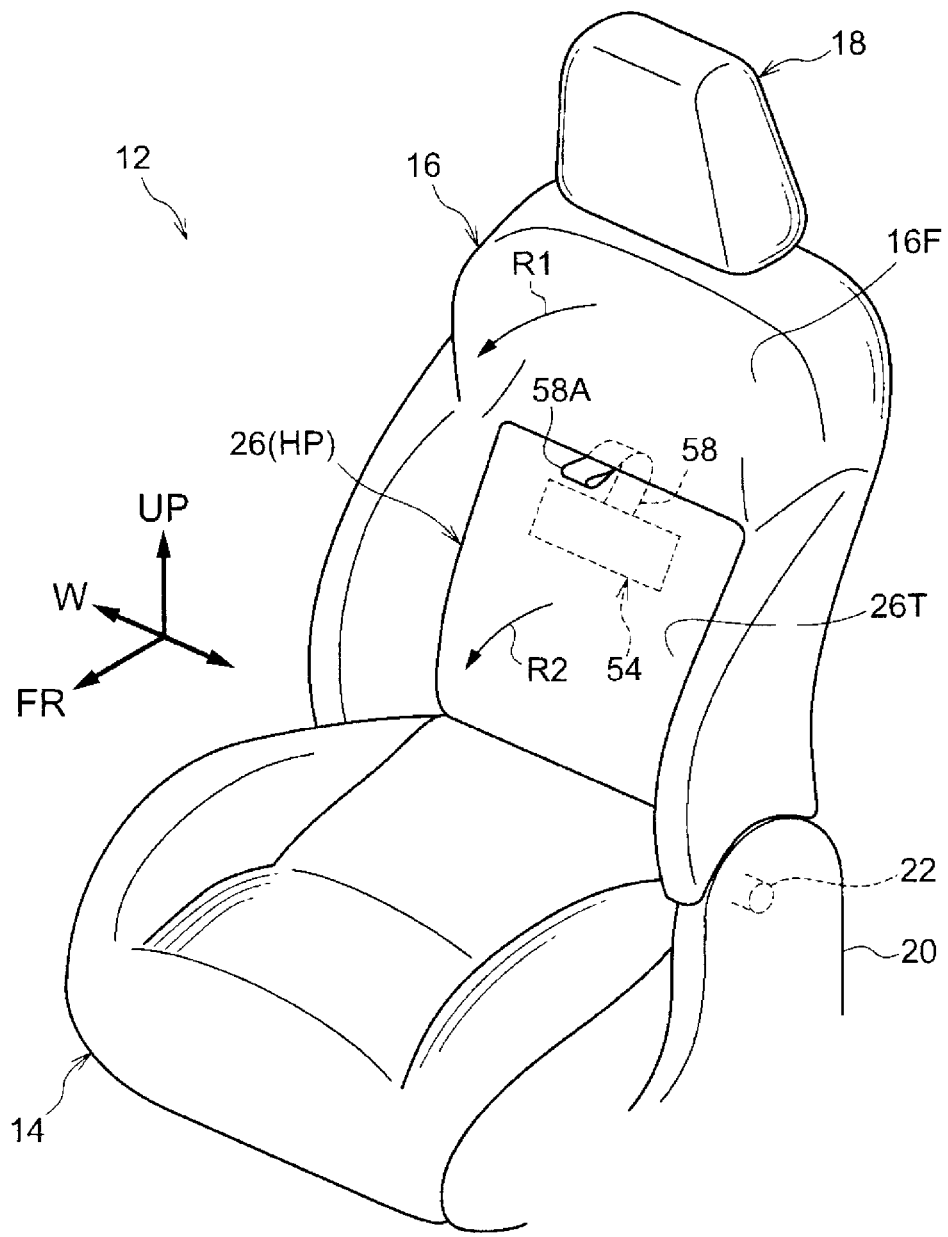
FIG. 1 is a perspective view illustrating a vehicle seat of an exemplary embodiment of the present invention from the front side.

FIG. 1 to FIG. 7 illustrate a vehicle seat 12 of an exemplary embodiment of the present invention. In the drawings, the arrow FR indicates the front of the vehicle in which the vehicle seat 12 is installed, the arrow W indicates the vehicle width direction, and the arrow UP indicates upwards. Note that the vehicle seat may be configured so as to be capable of rotating about a rotation axis that runs along the up-down direction. In such cases, depending on the rotation the vehicle front and the vehicle seat front may not be the same as one another. For simplicity, explanation is given below in which the vehicle seat 12 is installed facing the vehicle front. In the following explanation, when reference is made simply to the "front direction", "rear direction" and "width direction", these may be respectively understood to indicate the front direction, rear direction and width direction of the vehicle seat 12.

The vehicle seat 12 is installed to a vehicle body floor (overall depiction is omitted from the drawings), and includes a seat cushion 14 on which a passenger can sit, and a seatback 16 that is capable of supporting a back face (the back region) of the passenger (seated occupant) seated in the seat cushion 14. A headrest 18 that is capable of supporting the head of the seated occupant is further provided at an upper portion of the seatback 16.

A seat cushion frame is provided inside the seat cushion 14, and a seatback frame is provided inside the seatback 16. The seat cushion frame and the seatback frame are respectively capable of maintaining the shape of the seat cushion 14 and the seatback 16. The seat cushion 14 and the seatback 16 are moreover respectively capable of supporting the load of the seated occupant with a specific resilience using springs and cushion materials, not illustrated in the drawings.

A pair of support members 20 project upwards from the vehicle floor at positions to the rear of the seat cushion 14. A seatback shaft 22 spans between the pair of support members 20. The seatback 16 rotates about the seatback shaft 22 in the direction of the arrow R1 or the direction opposite thereto. For example, the seatback 16 can be rotated towards the rear side to increase an angle of tilt, and also rotated towards the front side to fold up over the seat cushion 14. The seatback 16 can moreover be fixed at a desired angle by a fixing mechanism, not illustrated in the drawings.

Figure 5:
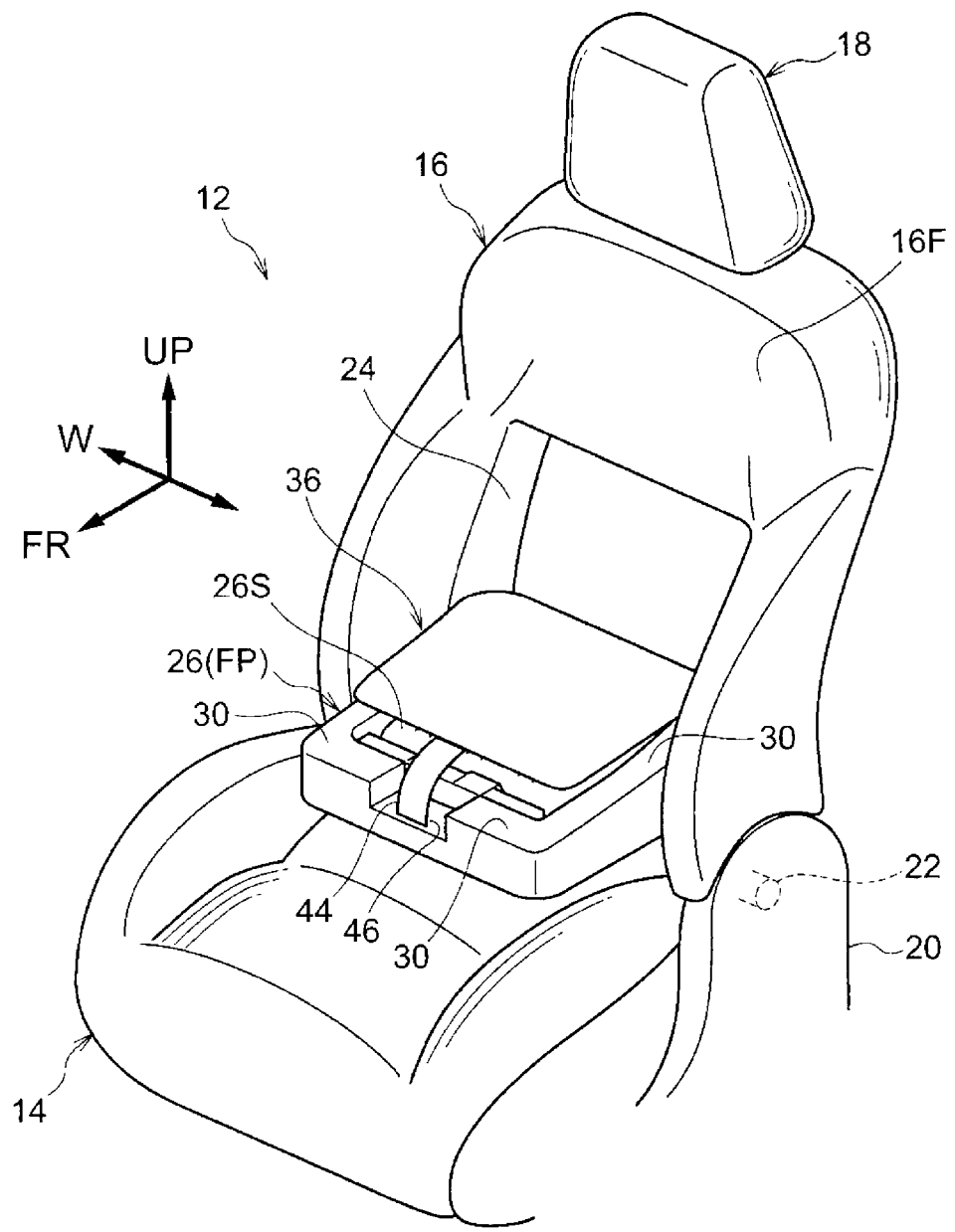
FIG. 5 is a perspective view illustrating a vehicle seat of an exemplary embodiment of the present invention from the front side in a state in which a placement member is in a lowered position.
Figure 6:
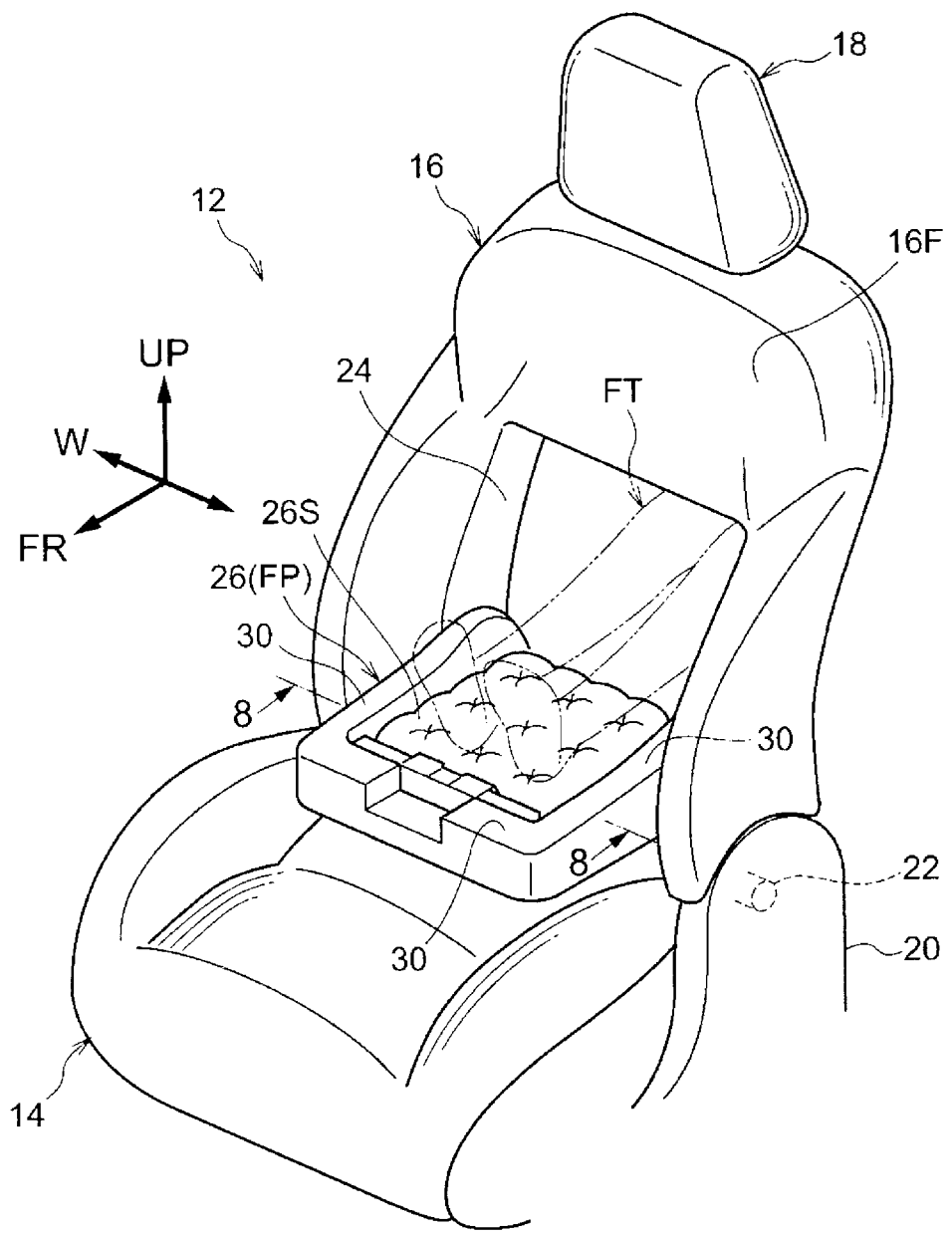
FIG. 6 is a perspective view illustrating a vehicle seat of an exemplary embodiment of the present invention from the front side in a state in which the vehicle seat is being used to rest the feet.
Figure 7:
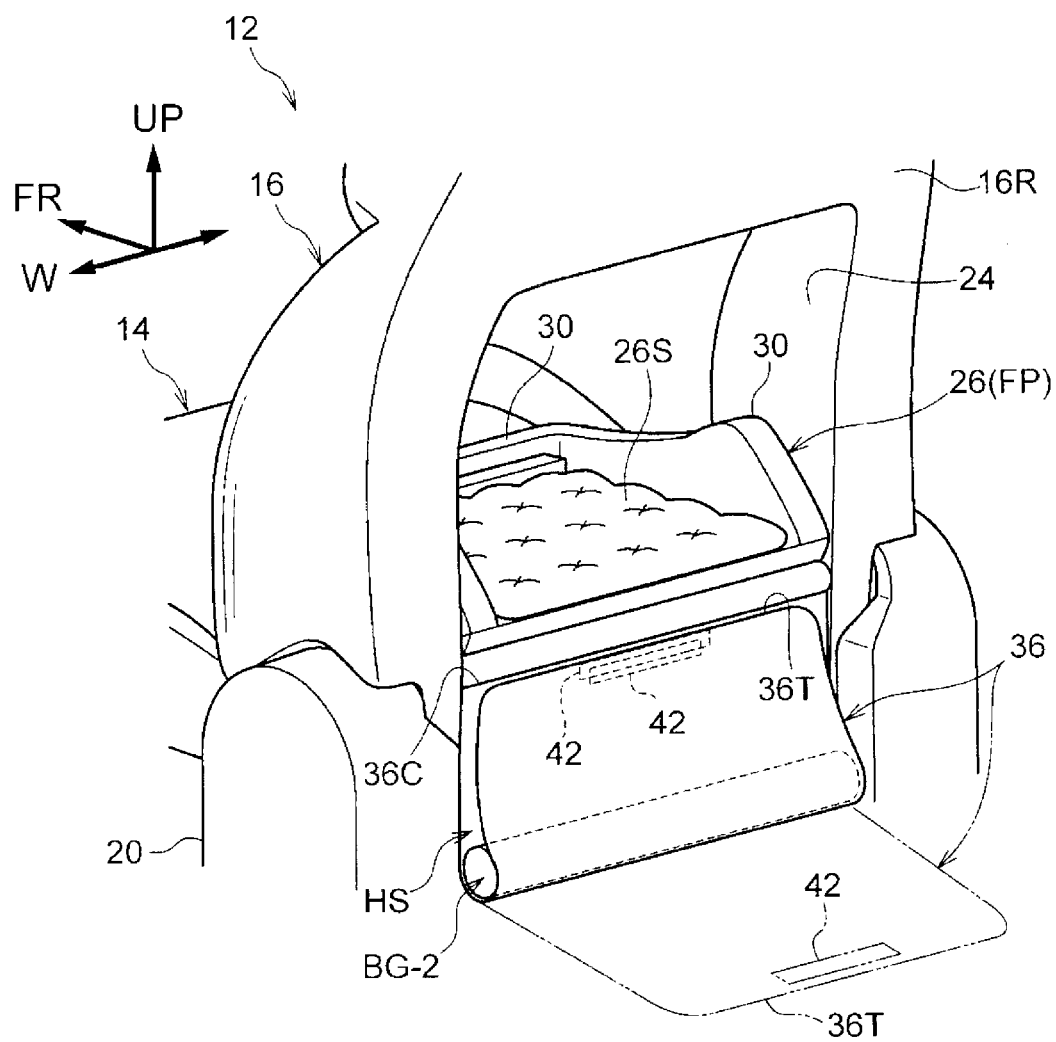
FIG. 7 is a perspective view illustrating a vehicle seat of an exemplary embodiment of the present invention from the rear side.

As illustrated in FIG. 5 to FIG. 7, the seatback 16 is formed with a penetrating portion 24 that penetrates from a seatback front face 16F side to a seatback back face 16R side along the thickness direction (front-rear direction). In the present exemplary embodiment, the penetrating portion 24 is formed at the width direction center of the seatback 16, spanning from a substantially intermediate portion to a lower portion in the height direction.

As illustrated in FIG. 1, a placement member 26 is disposed inside the penetrating portion 24. The placement member 26 is formed in a substantially plate shape, and a lower portion of the placement member 26 is provided with a support shaft 28 (see FIG. 2) that supports the placement member 26 on the seatback 16 such that the placement member 26 is capable of rotating in the arrow R2 direction and the direction opposite thereto. The placement member 26 moves (changes orientation) between a housed position HP wherein the placement member 26 is housed inside the penetrating portion 24 so as to close the penetrating portion 24, and a lowered position FP wherein the placement member 26 is lowered towards the front side by rotating about the support shaft 28 in the arrow R2 direction.

Figure 8:
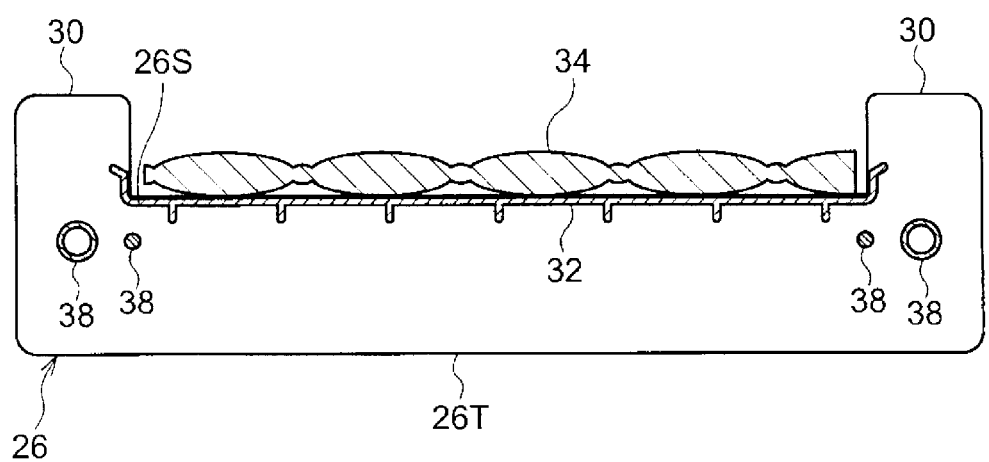
FIG. 8 is a cross-section taken along line 8-8 in FIG. 6, illustrating a placement member of a vehicle seat of an exemplary embodiment of the present invention.

A surface (upper face) when the placement member 26 is in the lowered position FP is formed so as to be substantially flat, and configures an article placement face 26S on which an article BG-1 can be placed. Moreover, as will be explained later, when it is being employed to rest the feet, the surface of the placement member 26 also acts the face on which the feet are actually placed. As illustrated in FIG. 8, a metal frame 38 of a specific shape is disposed inside the placement member 26, thereby maintaining the shape of the placement member 26.

In the present exemplary embodiment, the flatness of the article placement face 26S of the placement member 26 is maintained by a rigid flatness maintaining member 32 (note that complete flatness is not necessary). A cushion member 34 is moreover attached to the outside (the upper side in the lowered position FP) of the flatness maintaining member 32, thereby obtaining cushioning properties.

An upright wall 30 projects upwards from the periphery (an edge portion) of the article placement face 26S at the front side and the width direction outsides of the article placement face 26S. An article BG-1 that is placed on the article placement face 26S contacts the upright wall 30 when the article BG-1 moves towards the front direction or along the width direction, suppressing the article BG-1 from falling off the article placement face 26S.

Moreover, as illustrated in FIG. 1, the face on the opposite side of the placement member 26 to the article placement face 26S is contiguous to the seatback front face 16F of the seatback 16 in the housed position HP, configuring a seated occupant support face 26T that supports load from the seated occupant.

Figure 2:
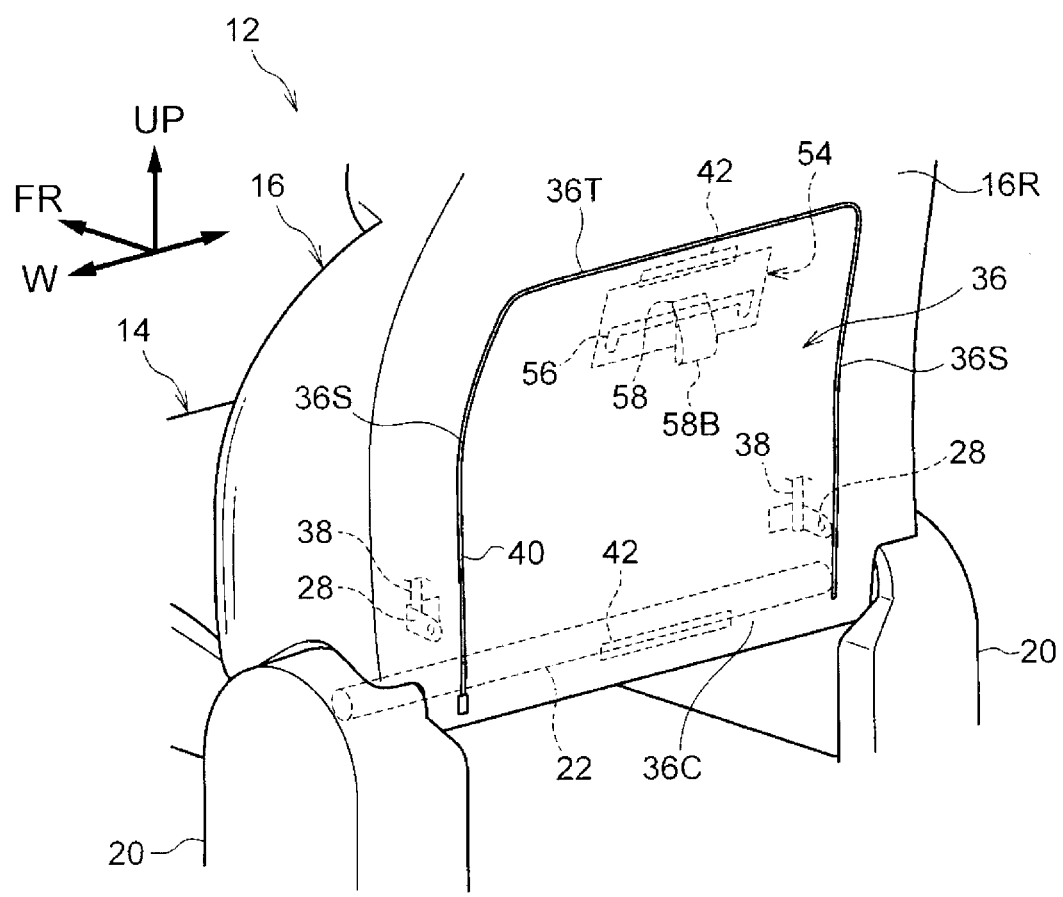
FIG. 2 is a partial perspective view illustrating a vehicle seat of an exemplary embodiment of the present invention from the rear side.

As illustrated in FIG. 2, a cloth form opening and closing member 36 that is formed from a flexible material is attached to the seatback back face 16R of the seatback 16. The opening and closing member 36 of the present exemplary embodiment is formed from a similar material to an outer covering of the seatback 16, and a lower edge of the opening and closing member 36 configures a base end portion 36C that is integrally formed so as to be continuous to the outer covering of the seatback 16.

The opening and closing member 36 is formed in substantially the same size as (or a slightly larger size than) an opening portion of the penetrating portion 24 (see FIG. 5 to FIG. 7). The opening and closing member 36 can close off the penetrating portion 24 from the seatback back face 16R side. The opening and closing member 36 is contiguous with the back face of the seatback 16 in the closed off state.

A fastener 40 is attached to a leading edge portion 36T and width direction both edge portions 36S of the opening and closing member 36, and to an upper edge portion and width direction both edge portions of the penetrating portion 24. In the present exemplary embodiment, the fastener 40 is disposed so as to substantially form an inverted U-shape as viewed from the back face side. The closed off state of the penetrating portion 24 from the seatback back face 16R side by the opening and closing member 36 can be maintained by closing the fastener 40.

Note that in the example illustrated in FIG. 2, a line fastener (zipper) is given as an example of the fastener 40, however configuration may also be made with face-to-face fastener or a point fastener. When configuration is made with a point fastener, the fastener 40 is preferably provided at plural locations such that the opening and closing member 36 does not fold over or flop down unintentionally in the closed state of the penetrating portion 24.

As illustrated in FIG. 6, in a state in which the placement member 26 is in the lowered position FP and the opening and closing member 36 is in a state opening up the penetrating portion 24, a passenger to the rear side of the vehicle seat 12 is able to pass their feet FT through the penetrating portion 24, and place the feet FT on the article placement face 26S of the placement member 26 (use it to rest the feet).

Anchor members 42 are attached to the leading edge portion 36T and the base end portion 36C of the opening and closing member 36. As illustrated in FIG. 7, since the opening and closing member 36 is flexible, when the opening and closing member 36 is folded back on itself at an intermediate portion and the anchor members 42 anchored to each other in the opened up state of the penetrating portion 24, a housing space HS is configured inside the opening and closing member 36. An article BG-2 can be housed inside the housing space HS.

As illustrated in FIG. 5, in a state in which the placement member 26 is in the lowered position FP, the opening and closing member 36 can be lowered towards the front side so as to cover the article placement face 26S from above. A tie member 44 is attached to the leading edge portion 36T of the opening and closing member 36. The covered state of the article placement face 26S by the opening and closing member 36 can be maintained by tying the tie member 44 to a tied-to portion 46 that is provided to the placement member 26. In particular, when an article BG-1 (see FIG. 3) is placed on the article placement face 26S, the article BG-1 can also be covered. The opening and closing member 36 also serves as an example of a covering member of the present invention.

An example of a specific configuration of the tie member 44 and the tied-to portion 46 is a fastener and a buckle. Configuration may also be made simply by tying a string shaped member, or configuration may be made wherein a ring shaped portion is formed at a leading end of a string, and the ring shaped portion is hooked onto a hook. The tie member 44 may moreover be provided at a width direction edge portion of the opening and closing member 36, with the tied-to portion 46 provided to the seatback 16.

Figure 4:
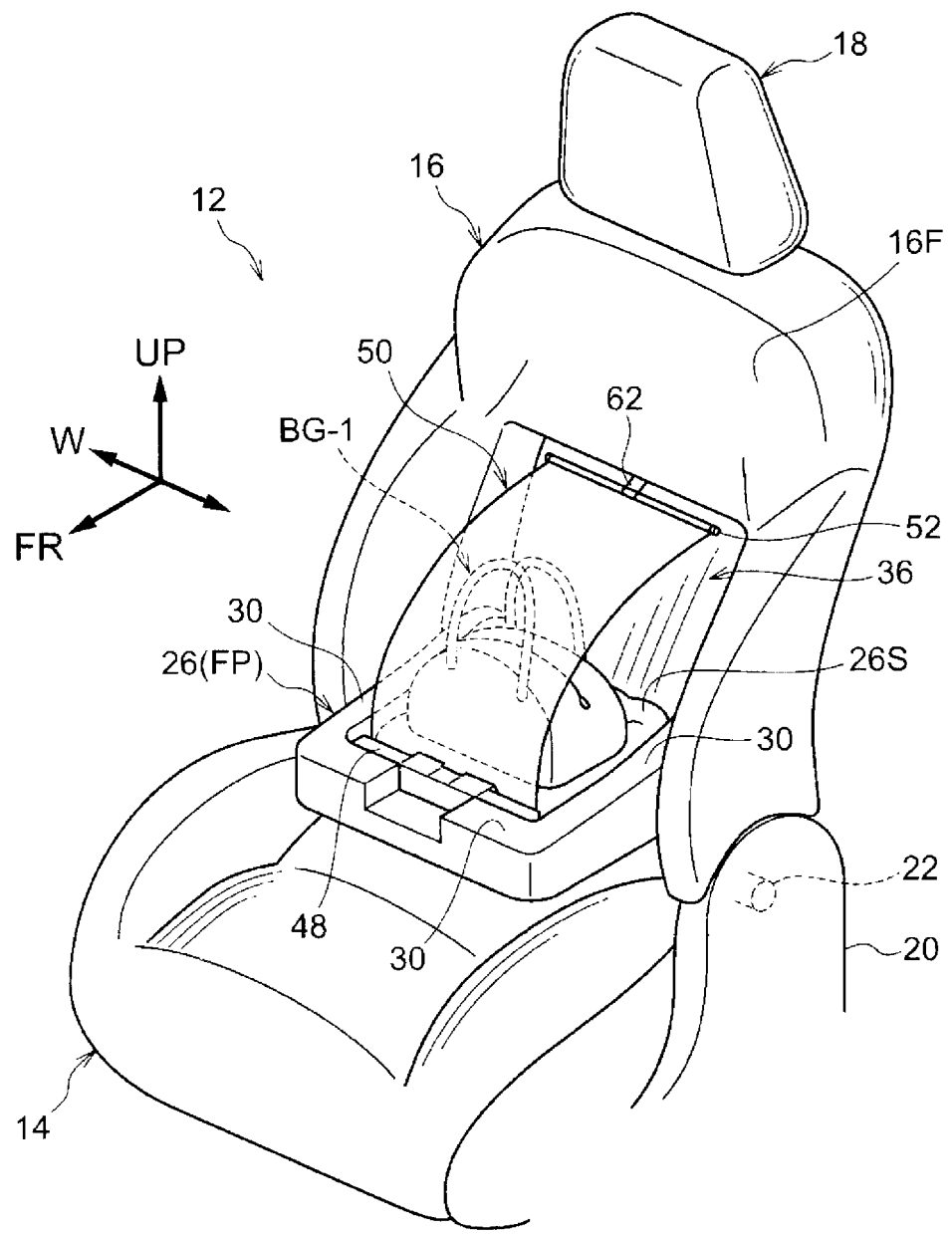
FIG. 4 is a perspective view illustrating a vehicle seat of an exemplary embodiment of the present invention from the front side in a state in which a placement member is in a lowered position.

As illustrated in FIG. 4, a winding shaft 48 that runs along the width direction is rotatably attached in the vicinity of the leading edge portion 36T of the placement member 26. A cover cloth 50 is wound onto the winding shaft 48, with the cover cloth 50 rotation biased in a winding on direction by a resilient member, not illustrated in the drawings.

A leading end shaft 52 is attached to a leading end of the cover cloth 50. The cover cloth 50 can be unwound from the winding shaft 48 by pulling on the leading end shaft 52.

A shaft retaining member 62 that is capable of supporting the leading end shaft 52 is provided to the seatback 16 at an upper edge of the penetrating portion 24. The unwound state of the cover cloth 50 can be maintained by retaining the leading end shaft 52 on the shaft retaining member 62. The article placement face 26S and an article BG-1 on the article placement face 26S can be covered in the unwound state of the cover cloth 50. The cover cloth 50 is an example of a covering member of the present invention.

As illustrated in FIG. 2, the seatback 16 is provided with a lock mechanism 54. When the placement member 26 is in the housed position HP, a lock tab 56 provided to the placement member 26 engages with the lock mechanism 54 such that the placement member 26 can be maintained in the housed position HP.

A lock release strap 58 extends from the lock mechanism 54. The lock release strap 58 is split into a bifurcated shape at a leading end side. One end 58A is exposed at the front side between the placement member 26 and the seatback 16 (see FIG. 1). The other end 58B of the lock release strap 58 is positioned between the placement member 26 and the opening and closing member 36, and is exposed at the back face side of the seatback 16 when the opening and closing member 36 is opened. The locking of the placement member 26 by the lock mechanism 54 can be released by pulling on either the one end 58A or the other end 58B of the lock release strap 58.

Explanation follows regarding operation of the vehicle seat 12 of the present exemplary embodiment.

As illustrated in FIG. 1, in the vehicle seat 12 the penetrating portion 24 is placed in a closed state when the placement member 26 is in the housed position HP (housed in the penetrating portion 24). In this state, the seated occupant support face 26T of the placement member 26 is contiguous to the front face of the seatback 16, and is able to support the load from the seated occupant. The placement member 26 is locked in the housed position HP by the lock mechanism 54, such that the placement member 26 does not unintentionally rotate (lower) in the arrow R2 direction.

As illustrated in FIG. 2, at the seatback back face 16R side of the seatback 16 the penetrating portion 24 is closed off by the opening and closing member 36, such that the placement member 26 is not exposed. The placement member 26 cannot be seen from the seatback back face 16R side of the seatback 16, and the opening and closing member 36 is contiguous to the seatback back face 16R of the seatback 16, this being excellent from the perspective of appearance (aesthetics).

Note that the locking of the placement member 26 by the lock mechanism 54 is released by pulling on the lock release strap 58. The one end 58A of the lock release strap 58 may be pulled directly, or the opening and closing member 36 may be placed in a fully or partially opened state and the thus exposed other end 58B of the lock release strap 58 may be pulled.

Figure 3:
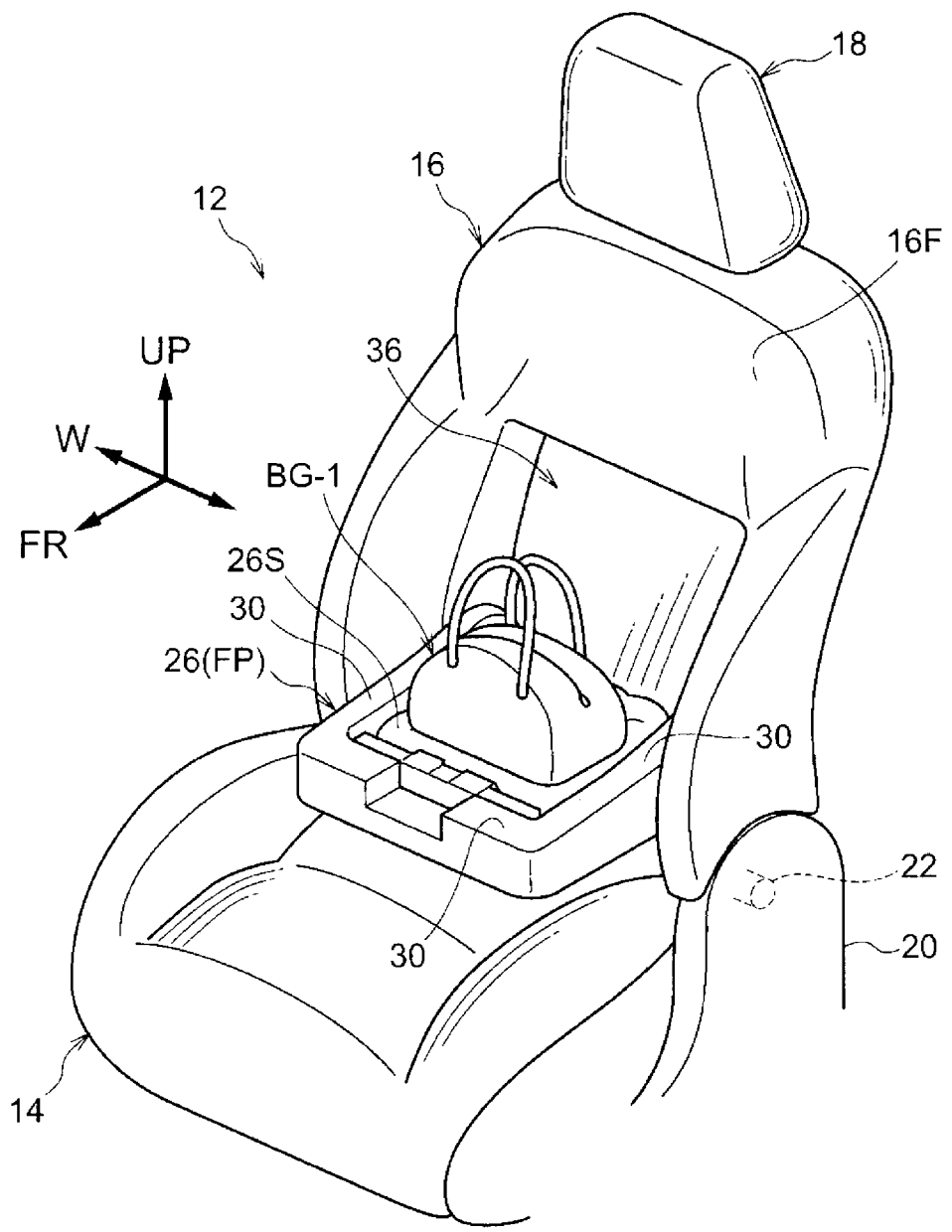
FIG. 3 is a perspective view illustrating a vehicle seat of an exemplary embodiment of the present invention from the front side in a state in which a placement member is in a lowered position.

The placement member 26 can accordingly be rotated in the arrow R2 direction and placed in the lowered position FP in a state in which there is no seated occupant present in the vehicle seat 12. As illustrated in FIG. 3, when the placement member 26 is in the lowered position FP, an article BG-1 can be placed on the article placement face 26S of the placement member 26. Moreover, as illustrated in FIG. 4, the cover cloth 50 may be pulled out and the article placement face 26S and the article BG-1 covered by the cover cloth 50 in a retained state of the leading end shaft 52 by the shaft retaining member 62.

In this state, the upright wall 30 is positioned at the front side and at both width direction sides of the article BG-1 on the article placement face 26S. The upright wall 30 can accordingly suppress the article BG-1 from falling off the article placement face 26S even when the article BG-1 moves towards the front or moves along the width direction.

The opening and closing member 36 is moreover positioned to the rear side of the article BG-1 in a state closing off the penetrating portion 24. The opening and closing member 36 can accordingly suppress the article BG-1 from falling off the article placement face 26S even when the article BG-1 moves towards the rear.

Note that in a state in which the article BG-1 is placed on the article placement face 26S, the article placement face 26S and the article BG-1 may be covered by the opening and closing member 36 instead of by the cover cloth 50 (see FIG. 5). Namely, the article placement face 26S and the article BG-1 may be covered by bending the opening and closing member 36 towards the front side with the cover cloth 50 in a wound-on state on the winding shaft 48. Here, the opening and closing member 36 can be maintained in the state covering the article placement face 26S by tying the tie member 44 of the opening and closing member 36 to the tied-to portion 46 of the placement member 26.

As illustrated in FIG. 6, in a state in which the placement member 26 is in the lowered position FP and an article BG-1 is not placed on the article placement face 26S, the opening and closing member 36 can be opened, opening up the penetrating portion 24. In the thus opened up state of the penetrating portion 24, the feet FT can be inserted through the penetrating portion 24 from the rear and placed on the article placement face 26S. Namely, it is possible to use the placement member 26 to rest the feet (as a footrest or legrest). For example, a seated occupant at the rear side of the vehicle seat 12 is able to adopt a posture with their feet FT extended even when the vehicle compartment is small.

Since the opening and closing member 36 is flexible, a movement region of the opening and closing member 36 when opening up the penetrating portion 24 can be made smaller by deforming the opening and closing member 36 as appropriate. For example, in an opening and closing member of rigid structure (that effectively does not deform), it is necessary to rotate the opening and closing member about a base end portion such that a leading end portion describes a circle, forming a fan shaped movement region. In the present exemplary embodiment, by deforming the opening and closing member 36, the penetrating portion 24 can for example be opened up (the movement region of the opening and closing member 36 can be made smaller) by moving the leading edge portion 36T straight downwards.

As illustrated in FIG. 7, in the opened state of the opening and closing member 36, the leading edge portion 36T side of the opening and closing member 36 is folded back towards the base end portion 36C side, and the anchor members 42 are anchored together at the leading edge portion 36T and the base end portion 36C, thereby configuring the housing space HS. An article BG-2 can be stored in the housing space HS. The opening and closing member 36 can moreover be prevented from making unintended contact with the floor of the vehicle body.

As can be seen from the above explanation, in the vehicle seat 12 of the present exemplary embodiment, the placement member 26 can be used to rest the feet from the rear side by opening the opening and closing member 36 in a state in which the placement member 26 is in the lowered position FP. By closing the opening and closing member 36 in a state in which the placement member 26 is in the lowered position FP, an article BG-1 can be placed on the article placement face 26S, and the article BG-1 can be suppressed from falling off at the rear side, such that the vehicle seat 12 has excellent usability.

Moreover, the article BG-1 is suppressed from falling off the article placement face 26S by the upright wall 30 that projects upwards at the front side and at both seat width direction sides of the article placement face 26S. The vehicle seat 12 of the present exemplary embodiment has excellent usability in this respect as well.

In the vehicle seat 12 of the present exemplary embodiment, the article BG-1 placed on the article placement face 26S can be covered using either the cover cloth 50 or the opening and closing member 36 that serve as covering members. Usability is excellent for example in the respect that falling or positional displacement of the article BG-1 can be suppressed, and also in the respect that it is difficult to see the article BG-1 from the outside. In particular, since both the cover cloth 50 and the opening and closing member 36 are flexible, the article BG-1 placed on the article placement face 26S can be covered so as to accommodate the shape and size of the article BG-1.

The leading end shaft 52 of the cover cloth 50 is moreover retained by the shaft retaining member 62, enabling the unwound state of the cover cloth 50, namely the covered state of the article BG-1 on the article placement face 26S, to be maintained. The covered state of the opening and closing member 36 over the article placement face 26S can be maintained by tying the tie member 44 to the tied-to portion 46. Namely, the covered state of the article BG-1 on the placement member 26 can be reliably maintained for both the cover cloth 50 and the opening and closing member 36.

Usability is also excellent in the respect that since the opening and closing member 36 is flexible, the movement region of the opening and closing member 36 when opening the penetrating portion 24 can be made smaller.

Note that in the above explanation, an example has been given in which the opening and closing member 36 doubles as a covering member of the present invention. Such a configuration enables the number of components to be reduced by omitting the cover cloth 50. However, in a configuration provided with both the opening and closing member 36 and the cover cloth 50, it is possible to cover an article BG-1 with the cover cloth 50 and also close off the penetrating portion 24 with the opening and closing member 36, thereby improving the appearance from the rear.

Configuration may also be made in which a member for covering the article placement face 26S (a member that functions as a covering member) is also provided in addition to the cover cloth 50 and the opening and closing member 36.

The housing space HS can be configured inside the opening and closing member 36 by folding the opening and closing member 36 over at an intermediate portion and anchoring together the anchor members 42 in a state in which the opening and closing member 36 has opened up the penetrating portion 24. The vehicle seat 12 of the present exemplary embodiment has excellent usability in the point that an article BG-2 can be housed inside the housing space HS. The housing space HS particularly preferably houses for example elongated objects since it has ample width in the seat width direction.

Moreover, in a state in which the placement member 26 is in the lowered position FP, the opening and closing member 36 can be opened (the penetrating portion 24 can be opened up) and an elongated shaped article can be inserted through the penetrating portion 24 and placed on the placement member 26.

What is claimed is:

1. A vehicle seat comprising:
    a seatback formed with a penetrating portion that penetrates from a front face side to a back face side;
    a placement member that is attached to the seatback so as to be capable of moving between a housed position housed inside the penetrating portion and closing off the penetrating portion and a lowered position brought down from the housed position towards the a vehicle front side; and
    a flexible opening and closing member that is attached to the seatback as a separate member from the placement member and is capable of opening the penetrating portion and closing off the penetrating portion from the seatback back face side.

2. The vehicle seat of claim 1, further comprising a covering member that is attached to the seatback, the placement member, or both, and that covers a surface of the placement member when the placement member is in the lowered position.

3. The vehicle seat of claim 2, wherein the opening and closing member also serves as the covering member.

4. The vehicle seat of claim 3, further comprising a tie member that ties at least a portion of the opening and closing member to the placement member or to the seatback in a state in which the surface of the placement member is covered by the opening and closing member.

5. The vehicle seat of claim 1, further comprising an anchor member that anchors one portion of the opening and closing member to another portion of the opening and closing member or to the seatback in a state in which the opening and closing member is opening up the penetrating portion and the one portion is folded back.

6. The vehicle seat of claim 1, further comprising an upright wall projecting up from the periphery of the surface of the placement member.

* * * * *